United States Patent
Heo et al.

(10) Patent No.: US 10,488,913 B2
(45) Date of Patent: Nov. 26, 2019

(54) SYSTEM ON CHIP RECEIVING SUPPLY VOLTAGE(S) VIA MERGED POWER RAIL, AND MOBILE SYSTEM INCLUDING SAME

(71) Applicant: SAMSUNG ELECTRONICS CO., LTD., Suwon-si, Gyeonggi-do (KR)

(72) Inventors: Junghun Heo, Suwon-si (KR); Myungchul Cho, Suwon-si (KR); Youn-Sik Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 95 days.

(21) Appl. No.: 15/090,723

(22) Filed: Apr. 5, 2016

(65) Prior Publication Data

US 2016/0357245 A1    Dec. 8, 2016

(30) Foreign Application Priority Data

Jun. 3, 2016  (KR) .................. 10-2015-0078554

(51) Int. Cl.
  *G06F 1/32*    (2019.01)
  *G06F 1/3296*    (2019.01)
  *G06F 1/26*    (2006.01)

(52) U.S. Cl.
  CPC .............. *G06F 1/3296* (2013.01); *G06F 1/26* (2013.01); *Y02D 10/172* (2018.01)

(58) Field of Classification Search
  CPC ...... G06F 1/26; G06F 1/3296; Y02B 60/1285
  See application file for complete search history.

(56) References Cited

U.S. PATENT DOCUMENTS

| | | | |
|---|---|---|---|
| 8,972,759 B2* | 3/2015 | Doshi | G06F 1/3203 713/320 |
| 9,823,719 B2* | 11/2017 | Jahagirdar | G06F 1/26 |
| 2005/0218725 A1* | 10/2005 | Strauss | H02J 1/06 307/82 |
| 2009/0256607 A1* | 10/2009 | Smith | G06F 1/32 327/198 |
| 2013/0283083 A1 | 10/2013 | Vilhauer et al. | |
| 2013/0339777 A1 | 12/2013 | Varma et al. | |
| 2014/0068285 A1* | 3/2014 | Lee | G06F 1/324 713/300 |
| 2014/0173311 A1 | 6/2014 | Park et al. | |
| 2014/0281594 A1 | 9/2014 | Yang et al. | |
| 2016/0013643 A1* | 1/2016 | Park | H02J 3/00 713/300 |
| 2016/0013654 A1* | 1/2016 | Saha | H02J 1/14 307/29 |
| 2016/0259353 A1* | 9/2016 | Morroni | H02M 3/285 |

* cited by examiner

*Primary Examiner* — Fahmida Rahman
(74) *Attorney, Agent, or Firm* — Volentine, Whitt & Francos, PLLC

(57) ABSTRACT

A mobile system includes a SOC and PMIC. The SOC includes a first signal processing circuit and a second signal processing circuit, and generates a dynamic voltage scaling (DVS) control signal based on operating states of the first signal processing circuit and the second signal processing circuit. The PMIC generates a supply voltage whose magnitude is controlled in response to the DVS control signal, and provides the supply voltage to the first signal processing circuit and the second signal processing circuit through a single power rail.

18 Claims, 8 Drawing Sheets

| CASE | DVS_CON<1> | DVS_CON<0> | VS |
|---|---|---|---|
| 1 | 0 | 0 | retention voltage |
| 2 | 0 | 1 | AP minimum voltage |
| 3 | 1 | X | maximum voltage |

CP VOLTAGE = 1.0V
RETENTION VOLTAGE = 0.7V
AP VOLTAGE = 0.9~1.1V

SYSTEM ON CHIP RECEIVING SUPPLY VOLTAGE(S) VIA MERGED POWER RAIL, AND MOBILE SYSTEM INCLUDING SAME

CROSS-REFERENCE TO RELATED APPLICATION

This application claims priority under 35 U.S.C. § 119 to Korean Patent Application No. 10-2015-0078554 filed on Jun. 3, 2015, the contents of which are hereby incorporated by reference in their entirety.

BACKGROUND

Embodiments of the inventive concept relate to mobile systems, and more particularly, to mobile systems including a system-on-chip that receives one or more supply voltage(s) via a merged power rail. The so called system-on-chip (SOC) has become a staple component in many contemporary electrical systems and electronic devices. A SOC typically includes multiple circuit blocks, such as an application processor (AP) and a communication processor (CP). Each circuit block will have its own power consumption characteristics, and over time the level and nature of one or more power supply voltage(s) provided to a circuit block will vary with particular use. That is, power consumption at any given moment in operating time may vary between circuit blocks. In contemporary mobile systems, the provision and control of power supply voltage(s) relative to respective circuit blocks is substantially independent. That is, the supply, monitoring and regulation of power supply voltages with respect to each circuit block is uncorrelated, or controlled at a relatively high control level. This creates control delays and resulting inefficiencies in the conservation of power—an important function in mobile systems. Furthermore, multiple power rails have been used to provide power supply voltages to respective circuit blocks. This drives up the overall size of the constituent system. More recently, the possibility of providing one or more supply voltage(s) to multiple circuit blocks in a SOC via a single power rail has been investigated.

SUMMARY

Embodiments of the inventive concept provide a mobile system capable of adjusting one or more power supply voltage(s) at relatively high speed in view of conditions of circuit blocks of a system-on-chip (SOC) in the mobile system including the SOC that receives power supply voltages via a merged power rail.

Embodiments of the inventive concept also provide a method of supplying a supply voltage to a system on a chip (SOC) which is able to adjust supply voltages with high speed according to operating states of the SOC in a mobile system including the SOC that receives supply voltages through a merged power rail.

The technical objectives of the inventive concept are not limited to the above disclosure; other objectives may become apparent to those of ordinary skill in the art based on the following descriptions.

In accordance with an aspect of the inventive concept, a mobile system includes a system on a chip (SOC) and a power management integrated circuit (PMIC).

The SOC includes a first signal processing circuit and a second signal processing circuit, and generates a dynamic voltage scaling (DVS) control signal based on operating states of the first signal processing circuit and the second signal processing circuit. The PMIC generates a supply voltage whose magnitude is controlled in response to the DVS control signal, and provides the supply voltage to the first signal processing circuit and the second signal processing circuit through a single power rail.

In one embodiment, the first signal processing circuit may include an application processor, and the second signal processing circuit may include a communication processor.

In another embodiment, in a sleep mode in which the first signal processing circuit and the second signal processing circuit do not operate, the supply voltage may have a voltage level which maintains basic operations of the SOC.

In still another embodiment, the basic operations may include displays of time, weather, a title of a song in replay, an unanswered call, and a text message.

In yet another embodiment, when the first signal processing circuit operates and the second signal processing circuit is in a sleep mode, the supply voltage may have a voltage level of an operating voltage of the first signal processing circuit.

In yet another embodiment, when both of the first signal processing circuit and the second signal processing circuit operate, the supply voltage may have a voltage level of the higher voltage of an operating voltage of the first signal processing circuit and an operating voltage of the second signal processing circuit.

In yet another embodiment, the first signal processing circuit may generate the DVS control signal based on operating states of the first signal processing circuit and the second signal processing circuit.

In yet another embodiment, the communication processor may include a modem.

In yet another embodiment, the first signal processing circuit may include a central processing unit (CPU) in which first data is stored, and an interface circuit configured to receive the first data from the CPU and output the first data, and a power control circuit. The power control circuit may monitor operating states of the first signal processing circuit and the second signal processing circuit, and generate the DVS control signal based on the operating states of the first signal processing circuit and the second signal processing circuit.

In yet another embodiment, the first data may be data corresponding to a level of the supply voltage output from the PMIC in response to operating states of the SOC.

In yet another embodiment, the PMIC may include an interface circuit, a plurality of registers, a comparator, a selecting circuit and a power converter.

The interface circuit may receive the first data from the SOC. The plurality of registers may store the first data received from the interface circuit. The comparator may compare more than two of output signals of the registers, and output a highest voltage value. The selecting circuit may select and output one of an output signal of the comparator and output signals of the registers in response to the DVS control signal. The power converter may generate the supply voltage which is controlled in response to an output signal of the selecting circuit.

In yet another embodiment, the SOC may further include a power control circuit configured to generate the DVS control signal based on operating states of the first signal processing circuit and the second signal processing circuit.

In yet another embodiment, the first signal processing circuit may include a central processing unit (CPU) in which first data is stored and an interface circuit configured to receive the first data from the CPU and output the first data.

In accordance with another aspect of the inventive concept, a mobile system includes a system on a chip (SOC) and a power management integrated circuit (PMIC).

The SOC generates a dynamic voltage scaling (DVS) control signal based on operating states of a plurality of signal processing circuits included in the SOC. The PMIC generates a supply voltage whose magnitude is controlled in response to the DVS control signal, and provides the supply voltage to the plurality of signal processing circuits through a single power rail.

In one embodiment, the SOC may include first to Nth signal processing circuits, and a power control circuit configured to monitor operating states of the first to Nth signal processing circuits, and generate the DVS control signal based on the operating states of the first to Nth signal processing circuits.

In another embodiment, the first signal processing circuit may include an application processor, and each of the second to Nth signal processing circuits may not include the application processor.

In accordance with an aspect of the inventive concept, a method of supplying a supply voltage to a system on a chip (SOC) including a first signal processing circuit and a second signal processing circuit includes monitoring operating states of the first signal processing circuit and the second signal processing circuit; generating a dynamic voltage scaling (DVS) control signal based on the operating states of the first signal processing circuit and the second signal processing circuit; generating a supply voltage whose magnitude is controlled in response to the DVS control signal; and providing the supply voltage to the first signal processing circuit and the second signal processing circuit through a single power rail.

In one embodiment, the method may further include storing data corresponding to a level of the supply voltage output from a power management integrated circuit (PMIC) based on operating states of the SOC by a central processing unit (CPU) included in the SOC; and providing the data to registers included in the PMIC.

A mobile system including a system on a chip (SOC) according to embodiments of the inventive concept may automatically adjust a voltage level of a supply voltage VS with hardware in response to a DVS control signal DVS_CON that is generated by the SOC by a power management integrated circuit (PMIC).

BRIEF DESCRIPTION OF THE DRAWINGS

The foregoing and other features and advantages of the inventive concept will be apparent from the more particular description of preferred embodiments of the inventive concepts, as illustrated in the accompanying drawings in which like reference characters refer to like or similar features. The drawings are not necessarily to scale, emphasis instead being placed upon illustrating principles of the inventive concept. In the drawings.

DETAILED DESCRIPTION

Figure 1:
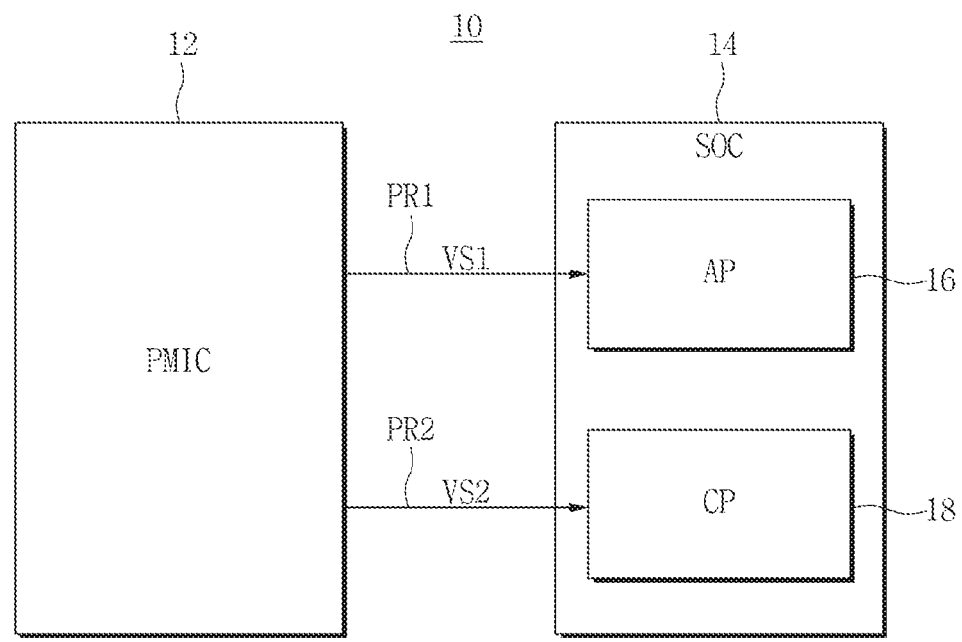
FIG. 1 is a block diagram illustrating a conventional mobile system including a system-on-chip (SOC)

Example embodiments of the inventive concept will now be described in some additional detail with reference to the accompanying drawings. Those skilled in the art will, however, understand that the illustrated embodiments are merely examples of the inventive concept.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, but the use of the singular form in the present document should not preclude the presence of more than one referent. In other words, elements of the invention referred to in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Meanwhile, it should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure (FIG.) 1 is a block diagram illustrating a conventional mobile system 10 including a system-on-chip (SOC) 14.

The conventional mobile system 10 includes; a power management integrated circuit (PMIC) 12 that supplies first and second power supply voltages (VS1 and VS2) to circuit blocks such as an application processor (AP) 16 and a communication processor (CP) 18 included in the SOC 14 via separate power rails (PR1 and PR2). Given this general approach, as the number of power rails used to provide power supply voltage(s) from the PMIC 12 to the SOC 14 increases, a corresponding number of corresponding passive elements (e.g., inductor(s) and/or capacitor(s)) associated with the power rails also increases. As a result, conventional mobile system including one or more SOC(s), including one or more circuit block(s) are trending upward in overall circuit size.

Further, in the conventional mobile system 10, each circuit block (e.g., processor) may monitor its own operating state, as well as the operating state(s) of other circuit block(s). This monitoring of operating state(s)—and the commensurate monitoring of power consumption—may be performed across multiple circuit blocks using one or more circuits. However, achieved operating state monitoring may be used to define, change and/or control the provision of one or more power supply voltages with respect to one or more circuit blocks in order to conserve power within the mobile system. Unfortunately, conventional mobile systems like the one illustrated in FIG. 1 require a significant amount of time to monitor and appropriately define power supply voltages being provided via multiple power rails. This relatively slow (or lagging) power supply voltage control functionality sometimes fails to change (i.e., increase of decrease) power supply voltage in a timely manner. Such failure leads to wasteful power consumption or unnecessary performance degradation.

Figure 2:
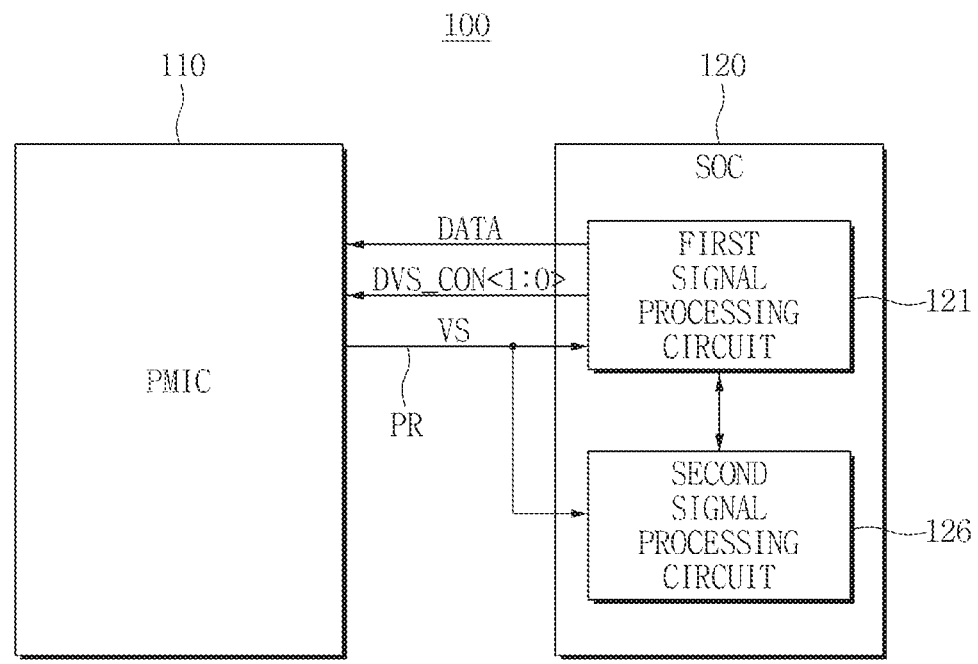
FIG. 2 is a block diagram illustrating a mobile system including a SOC according to an embodiment of the inventive concept.

FIG. 2 is a block diagram illustrating a mobile system 100 including an SOC according to an embodiment of the inventive concept.

Referring to FIG. 2, the mobile system 100 generally includes a SOC 120 and a power management integrated circuit (PMIC) 110.

Here, the SOC 120 is illustrated as including a first signal processing circuit 121 and a second signal processing circuit 126, where the first signal processing circuit 121 might be, for example, a general processor, computational logic, an application processor or similar circuit blocks, and the second signal processing circuit 126 might be, for example, a communication processor, a modem, radio frequency (RF) circuitry, a telecommunications processor, or similar circuit block. Regardless of other specific content or functionality, the SOC 120 will generate a dynamic voltage scaling (DVS) control signal (DVS_CON) that is provided to the PMIC 110. This DVS control signal controls the generation and provision of one or more power supply voltage by the PMIC 110 to the SOC 120. For example, the DVS control signal might be generated in accordance with the respective operating states of the first signal processing circuit 121 and second signal processing circuit 126.

In the illustrated example of FIG. 2, it is assumed that the SOC 120 further provides certain "power data" (DATA) corresponding to, indicative of, or responsive to one or more power supply voltages provided by the PMIC 110 to the SOC 120. That is, the one or more power supply voltage(s) provided by the PMIC 110 may have various and respective levels, ON/OFF duration or duty cycles, periods, frequencies, pulse width(s), etc., that may be controlled by the DVS control signal in response, for example, to one or more of the operating states of circuit blocks (e.g., the first signal processing circuit 121 and second signal processing circuit 126) of the SOC 120. In the example illustrated in FIG. 2, it is further assumed that the PMIC 110 generate a single power supply voltage (VS) having a magnitude that is controlled in response to the DVS control signal, where the supply voltage VS is commonly provided to the first signal processing circuit 121 and second signal processing circuit 126 via a single power rail (PR). It is also assumed in this straight-forward teaching example that the DVS control signal (DVS_CON) is a 2-bit digital control signal (i.e., a signal including two (2) bits; DVS_CON<0>, and DVS_CON<1>).

In this context, the term "magnitude" as applied to the one or more power supply voltage(s) provided by the PMIC 110 means any one or more controllable aspects of the one or more power supply voltages, such as voltage level, ON/OFF duration or duty cycle, frequency, period, pulse width(s), etc. Further, the term "single power rail" refers to power supply connections between the PMIC 110 and SOC 120 that use only one power rail structure, as distinguished from power supply connections including 2 or more power rail structures.

In view of the exemplary embodiment described in relation to FIG. 2, during a "sleep" operating mode for the mobile system 100 in which both the first signal processing circuit 121 and second signal processing circuit 126 do not significantly operate (i.e., are inactive), the power supply voltage VS provided by the PMIC 100 may have a relatively low magnitude, sufficient to maintain certain basic operations provided by the circuit blocks of the SOC 120. Examples of such "basic operations" include, by way of example, displaying time or similar background information like weather or a user-interactive menu/icon on a screen of the mobile system 100. Where the mobile system 100 is assumed to be a cellular telephone, such basic operations may include displaying last called numbers, missed calls, calling menus, etc. Where the mobile system is assumed to have audio and/or video playback capabilities, the basic operations may include song/video lists or menus, user control settings, etc.

Extending the foregoing example, it is now assumed that the mobile system 100 exits the sleep operating mode in response to a first external event (e.g., a user activation, an incoming call, etc.) and enters a first operating mode wherein the first signal processing circuit 121 is active while the second signal processing circuit 126 remains inactive, as in the sleep operating mode. In response to this changed operating mode, for example, the power supply voltage VS provided by the PMIC 110 may be increased to a first magnitude greater than a minimal magnitude associated with the sleep operating mode. Here, the first magnitude of the power supply voltage will be sufficient to support the active operating state of only the first signal processing circuit 121.

Extending the foregoing examples again, it is now assumed that the mobile system 100 exits the first operating mode in response to a second external event and enters a second operating mode wherein both the first signal processing circuit 121 and second signal processing circuit 126 are active. In response to this again changed operating mode, for example, the power supply voltage VS provided by the PMIC 110 may be increased further to a second magnitude greater than the first magnitude, where second magnitude of the power supply voltage will be sufficient to support the active operating states of both the first signal processing circuit 121 and the second signal processing circuit 126.

In the foregoing examples, the minimal, first and second magnitudes for the power supply voltage VS may simply be a lowest, an intermediate and a highest voltage level for the power supply voltage VS. However, this need not always be the case, and the inventive concept contemplates one or more differently variable power supply voltage(s) in certain embodiments.

Regardless of the definition and approach to variance in the power supply voltage VS, some circuitry resident in the SOC 120 may be used to generate a corresponding DVS control signal (DVS_CON) indicative of, response to and/or associated with the operating states of the first signal processing circuit 121 and second signal processing circuit 126. In certain embodiments of the inventive concept consistent with the illustrated embodiment of FIG. 2, the first signal processing circuit 121 may be used to generate the DVS control signal.

Figure 3:
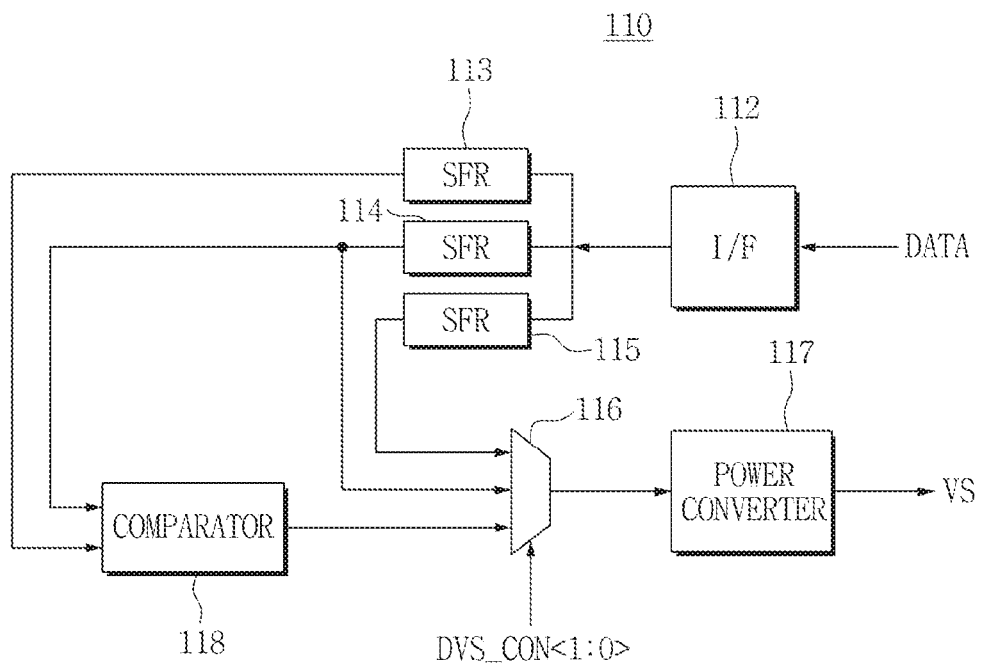
FIG. 3 is a block diagram further illustrating in one example the power management integrated circuit (PMIC) of FIG. 2.

FIG. 3 is a block diagram further illustrating in one example the power management integrated circuit (PMIC) 110 of the mobile system 100 of FIG. 2.

Referring to FIG. 3, the PMIC 110 includes an interface circuit (I/F) 112, a plurality of registers (SFR) 113, 114 and 115, a comparator 118, a selecting circuit 116 and a power converter 117.

The interface circuit 112 receives the power data (DATA) from the SOC 120. The plurality of registers 113, 114 and 115 may be used to store the power data received via the interface circuit 112. The comparator 118 may be used to compare power data (or portions of power data, such as respective bits or bytes of power data) stored in the registers 113, 114 and 115 in order to output a highest power data value. The selecting circuit 116 may then be used to select and output either an output signal of the comparator 118, or one of the power data portions stored in the registers 113, 114 and 115 in response to the DVS control signal (DVS_CON). The power converter 117 may then be used to generate the power supply voltage VS in response to an output signal selected by the selecting circuit 116.

Figure 4:
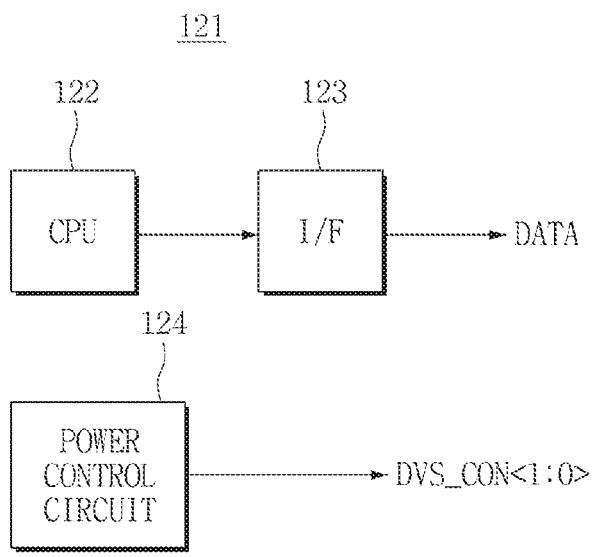
FIG. 4 is a block diagram further illustrating in one example the first signal processing circuit of the SOC of FIG. 2.

FIG. 4 is a block diagram further illustrating in one example the first signal processing circuit 121 included in the SOC 120 in the mobile system 100 of FIG. 2

Referring to FIG. 4, the first signal processing circuit 121 includes a central processing unit (CPU) 122 (or related memory or data cache) storing the power data, and an interface circuit 123 configured to receive the power data from the CPU 122 and output the power data (DATA) to a power control circuit 124. The power control circuit 124 monitors operating states of the first signal processing circuit 121 and the second signal processing circuit 126, and generates the DVS control signal based on the operating states of the first signal processing circuit 121 and second signal processing circuit 126.

In the illustrated embodiment of FIGS. 3 and 4, the power data may be data corresponding to a particular level (or level range) of the power supply voltage VS provided by the PMIC 110 in response to operating states of the circuit blocks in the SOC 120.

Figures 5, 6:
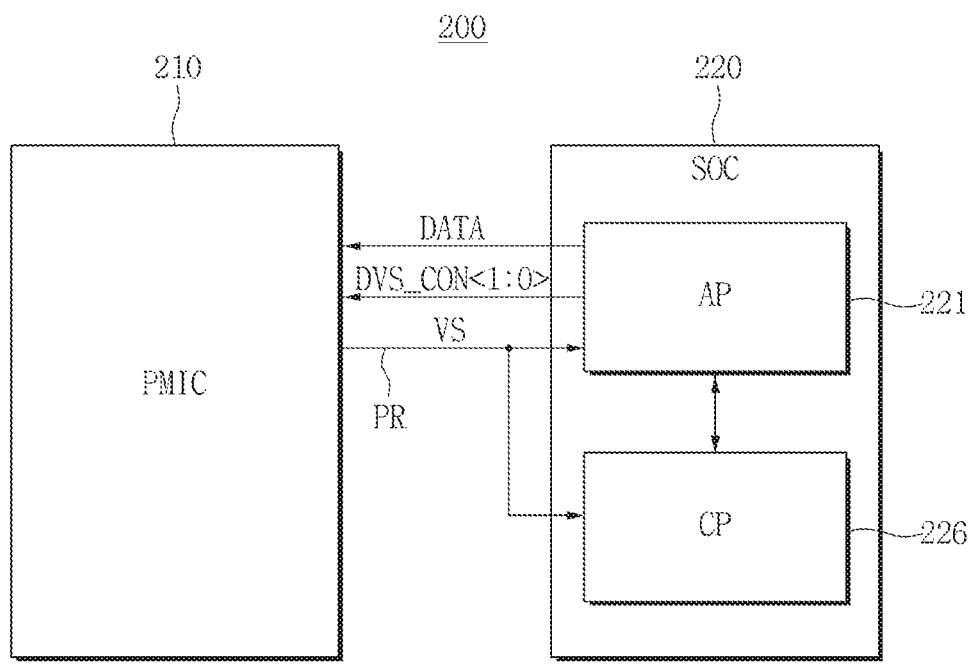
FIG. 5 is a block diagram illustrating a mobile system including a SOC according to another embodiment of the inventive concept.
FIG. 6 is a table listing various supply voltage conditions in relation to the value of an exemplary, dynamic voltage scaling (DVS) control signal that might be used in the mobile system of FIG. 5.

FIG. 5 is a block diagram illustrating a mobile system 200 including a SOC according to another embodiment of the inventive concept.

Referring to FIG. 5, the mobile system 200 includes SOC 220 and a PMIC 210.

The SOC 220 includes an application processor (AP) 221 and a communication processor (CP) 226 (e.g., a modem), and generates a dynamic voltage scaling (DVS) control signal (DVS_CON) based on operating states of the AP 221 and the CP 226. The AP 221 may provide power data (DATA) corresponding to a power supply voltage level output from the PMIC 210 in response to operating states of the SOC 220 to the PMIC 210. The PMIC 210 generates a power supply voltage VS having a magnitude controlled in response to the DVS control signal, and provides the power supply voltage VS to the AP 221 and the CP 226 via a single power rail PR.

FIG. 6 is a table listing power supply voltage conditions that may be adjusted according to a value of a dynamic voltage scaling (DVS) control signal in the mobile system of FIG. 5.

Referring to FIG. 6, when the DVS control signal has a logic state of 00, that is, when the DVS control signal indicates a sleep mode in which the AP 221 and the CP 226 are not active, the power supply voltage VS may have a minimal (retention) voltage level sufficient to maintain basic operations of the SOC 220. Further, when the DVS control signal has a logic state of 01, that is, when the AP 221 is active but the CP 226 remains inactive, the power supply voltage VS will a first voltage (AP minimum) level sufficient to support the active operating mode of the AP 221. Further, when the DVS control signal has a logic state of either 10 or 11, that is, when both of the AP 221 and CP 226 are both active, the power supply voltage VS may have a second voltage (maximum) level higher than the first voltage level sufficient to support that active operating mode of both the AP 221 and CP 226.

Figure 7:
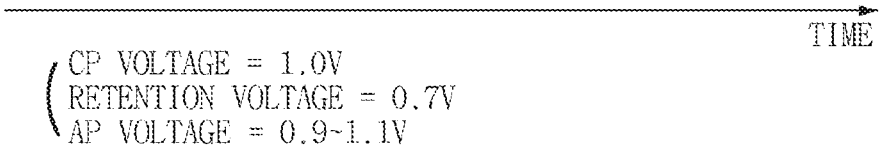
FIG. 7 is a table listing various supply voltage conditions in relation to operating states for an application processor (AP) and a communication processor (CP) in the mobile system of FIG. 5.

FIG. 7 is a table listing a timewise series of transitions for a power supply voltage as it is adjusted based on the respective operating states of an application processor (AP) and a communication processor (CP) in the mobile system of FIG. 5.

Referring to FIG. 7, when the AP 221 and the CP 226 are in the sleep mode, the power supply voltage VS will have a minimal or lowest voltage level (e.g., 0.7 V). However, when the CP 226 is in the sleep mode but the AP 221 is active, the power supply voltage VS will may have an intermediate voltage level (e.g., 0.9 V), and when both the AP 221 and CP 226 are active, the power supply voltage VS will have a highest voltage level (e.g., ranging from 1.0 V to 1.1 V).

Consistent with the foregoing, a mobile system including a SOC according to an embodiment of the inventive concept will include a PMIC capable of automatically changing the magnitude (e.g., the level) of a power supply voltage VS using hardware resources of the mobile system by generating a DVS control signal from circuitry disposes in the SOC. Therefore, mobile systems consistent with embodiments of the inventive concept may perform power supply voltage(s) adjustment based on the actual operating conditions (e.g., operating modes) for one or more circuits blocks of a constituent SOC 220 at relatively high speed. Therefore, the mobile system may operate with excellent power conservation with improved overall performance.

Figure 8:
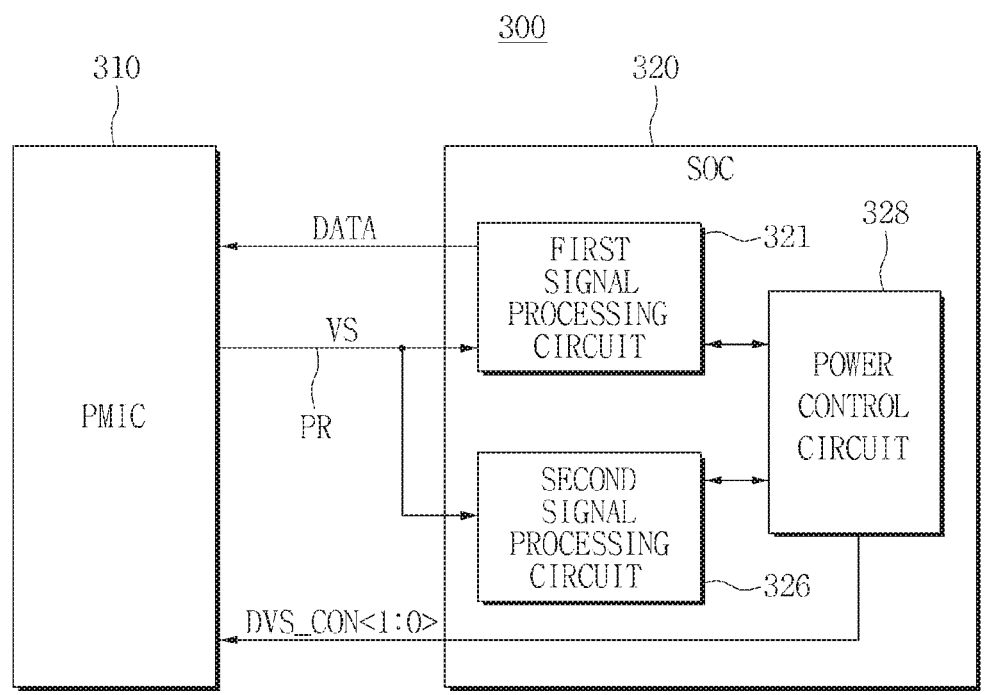
FIG. 8 is a block diagram illustrating a mobile system including a SOC according to still another embodiment of the inventive concept.

FIG. 8 is a block diagram illustrating a mobile system 300 including a SOC according to still another embodiment of the inventive concept.

Referring to FIG. 8, the mobile system 300 includes SOC 320 and PMIC 310.

The SOC 320 includes a first signal processing circuit 321, a second signal processing circuit 326 and a power control circuit 328 that may be used to generate the DVS control signal (DVS_CON) based on operating states of the first signal processing circuit 321 and the second signal processing circuit 326. The first signal processing circuit 321 may again be used to provide power data (DATA) to the PMIC 310 corresponding to one or more supply voltage(s) provided by the PMIC 310 in response to operating states of one or more circuits blocks of the SOC 320. Thus, the power control circuit 328 may generate the DVS control signal based on the operating states of the first signal processing circuit 321 and the second signal processing circuit 326. The PMIC 310 may generate a power supply voltage VS having a magnitude controlled by the DVS control signal, where the power supply voltage is provided to the to the first signal processing circuit 321 and second signal processing circuit 326 via a single power rail PR.

Figure 9:
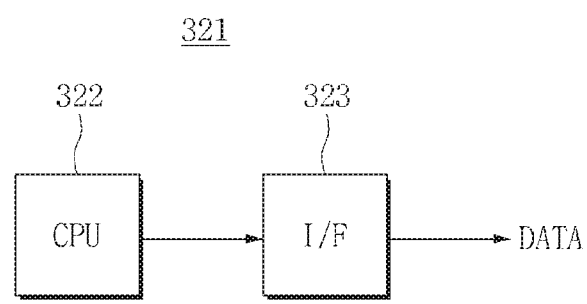
FIG. 9 is a block diagram further illustrating in one example the first signal processing circuit of the SOC in the mobile system of FIG. 8.

FIG. 9 is a block diagram further illustrating in one example the first signal processing circuit 321 included in the SOC 320 in the mobile system 300 of FIG. 8.

Referring to FIG. 9, the first signal processing circuit 321 may include a central processing unit (CPU) 322 (or related memory, register or cache) that stores the power data (DATA) then provided to an interface circuit 323. The power data may be data corresponding to a level of the power supply voltage VS provided by the PMIC 310 in response to operating states of the SOC 320.

Figure 10:
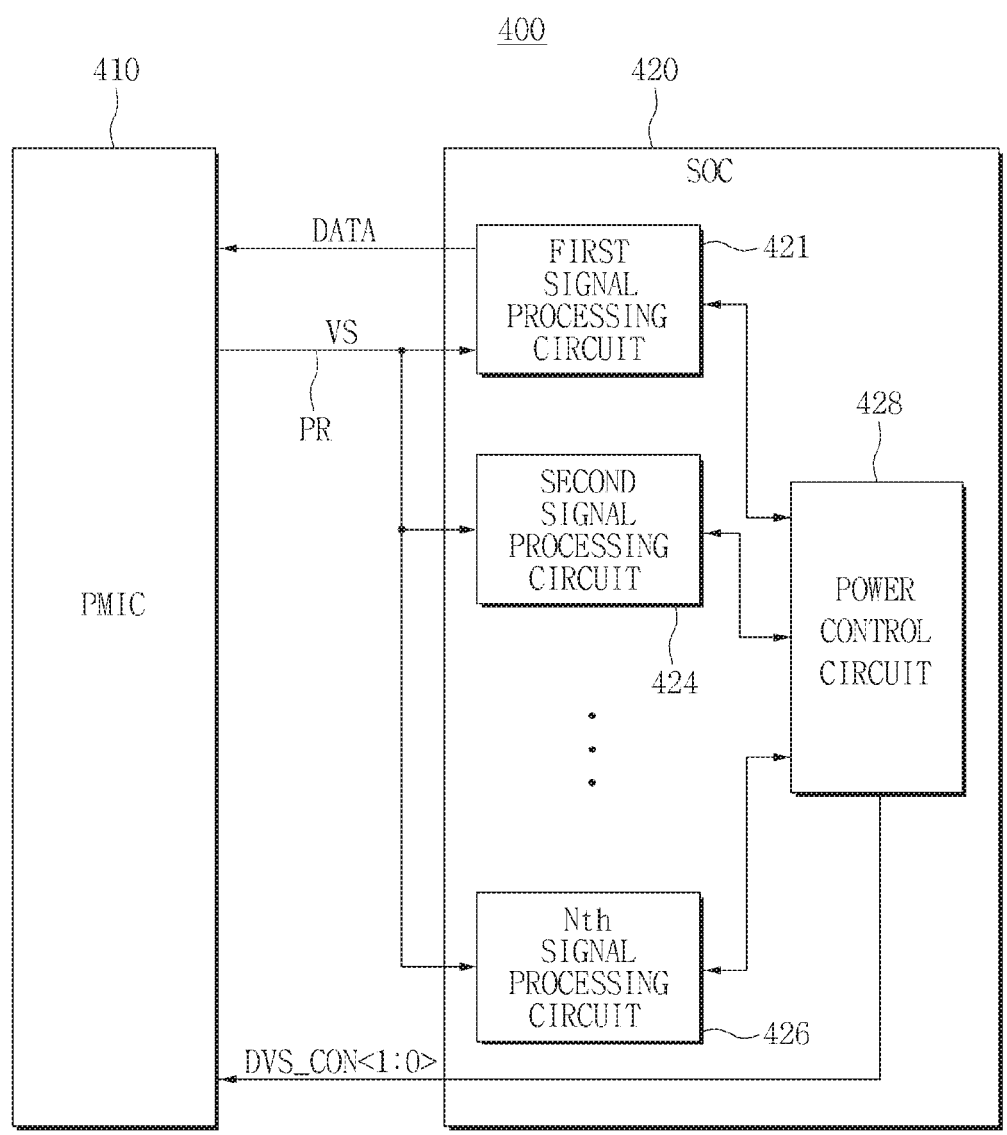
FIG. 10 is a block diagram illustrating a mobile system including an SOC according to yet another embodiment of the inventive concept.

FIG. 10 is a block diagram illustrating a mobile system 400 including a SOC according to yet another embodiment of the inventive concept.

Referring to FIG. 10, the mobile system 400 includes a SOC 420 and PMIC 410.

The SOC 420 includes first through Nth circuit blocks (e.g., signal processing circuits 421, 424 and 426) as well as a power control circuit 428. The SOC 420 generates a dynamic voltage scaling (DVS) control signal (DVS_CON) based on one or more operating modes (or operating states) of the first through Nth signal processing circuits 421, 424 and 426. Here again, it is assumed that the first signal processing circuit 421 is used to provide the power data (DATA) to the PMIC, but any one of the signal processing circuits might be used in the alternative. The power control circuit 428 generates the DVS control signal based on one or more of the operating states for the first through Nth signal processing circuits 421, 424 and 426. The PMIC 410 generates a power supply voltage VS having a magnitude controlled in response to the DVS control signal, and provides the supply voltage VS to the first through Nth signal processing circuits 421, 424 and 426 via a single power rail PR.

In an example embodiment, the first signal processing circuit 421 may include an application processor, and each of the second to Nth signal processing circuits 424 and 426 may not include the application processor.

Figure 11:
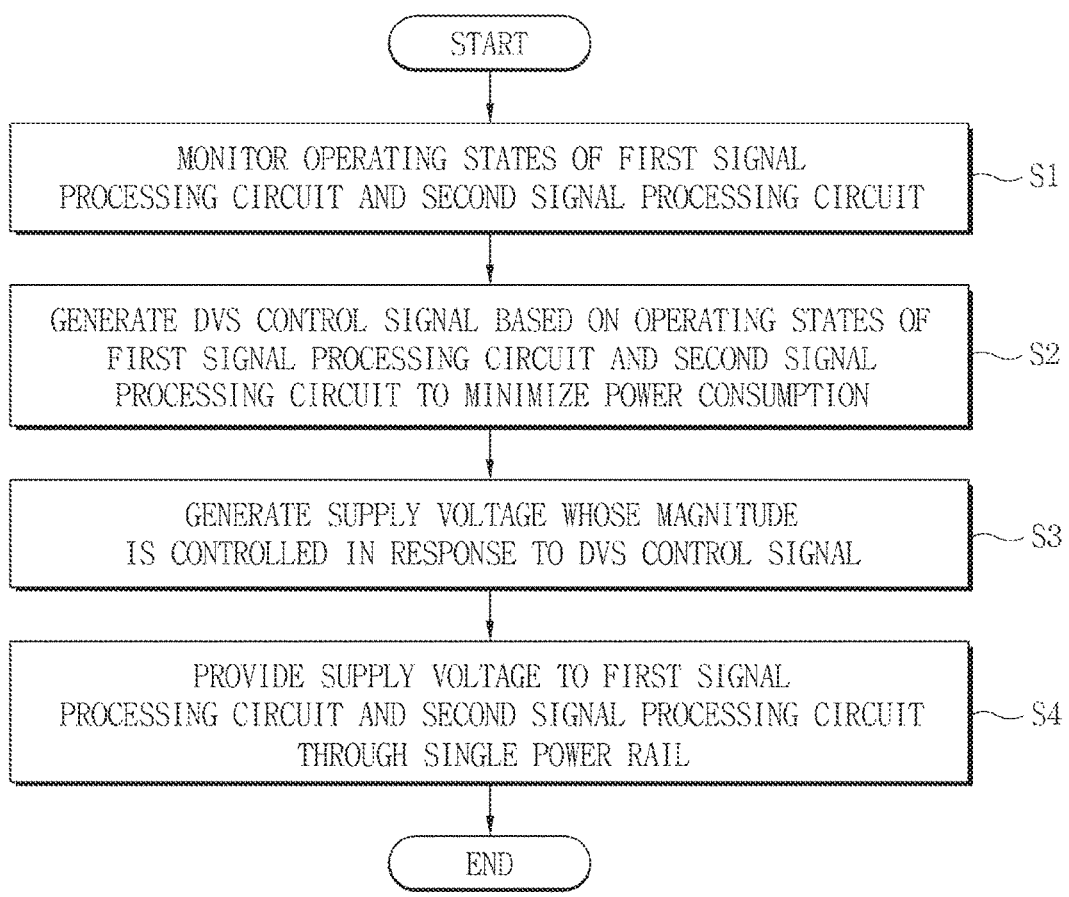
FIGS. 11 and 12 are respective flowcharts summarizing methods of supplying one or more supply voltage(s) to a SOC included in mobile systems according to embodiments of the inventive concept.
Figure 12:
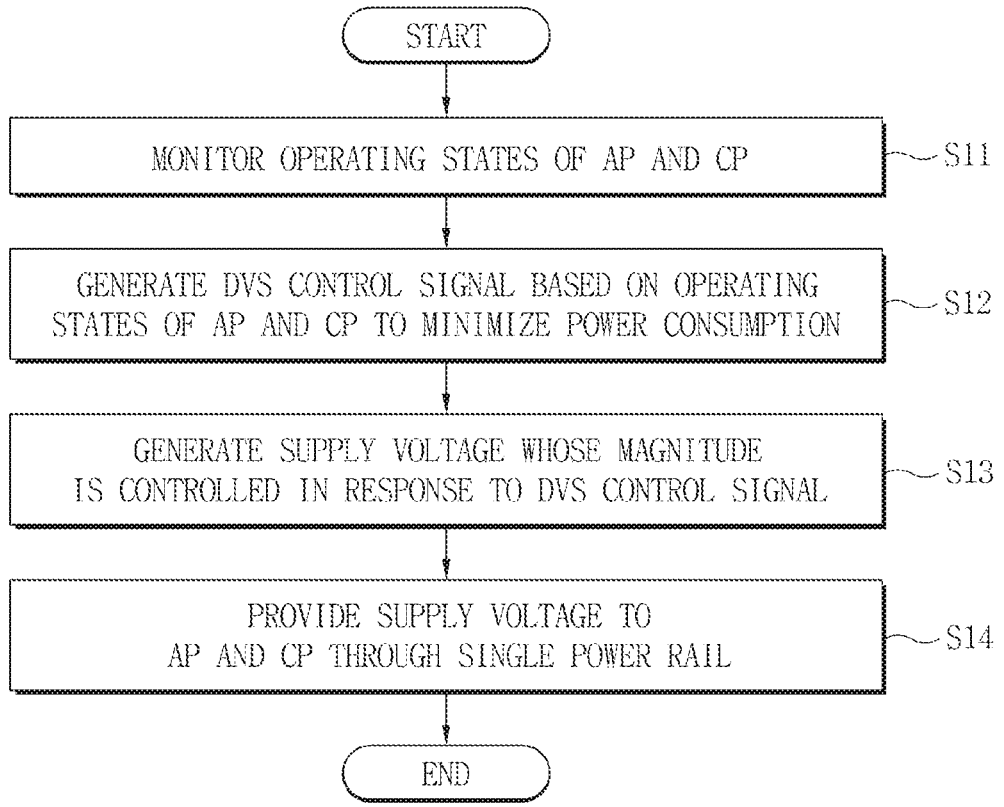

FIGS. 11 and 12 are respective flowcharts illustrating methods of supplying one or more power supply voltage(s) to circuit block(s) of a SOC included in a mobile system according to embodiments of the inventive concept.

Referring to FIG. 11, a method of supplying a power supply voltage to a SOC including a first signal processing circuit and a second signal processing circuit may include the following: monitoring operating modes (or states) for the first signal processing circuit and second signal processing circuit (S1); generating a dynamic voltage scaling (DVS) control signal based on operating states of the first signal processing circuit and second signal processing circuit to optimize (or minimize) power consumption of the mobile device (S2); generating a power supply voltage having a magnitude controlled by the DVS control signal (S3); and, providing the power supply voltage to the first signal processing circuit and second signal processing circuit via a single power rail (S4).

In the illustrated embodiment, the method of supplying a power supply voltage to the SOC may further include storing power data corresponding to the magnitude of the power supply voltage provided by the PMIC based on operating states of the circuit blocks of the SOC, and also providing the power data to one or more registers included in the PMIC.

Referring to FIG. 12, a method of supplying a power supply voltage to a SOC including an application processor (AP) and a communication processor (CP) may include the following: monitoring the operating states of the AP and the CP (S11); generating a dynamic voltage scaling (DVS) control signal based on operating states of the AP and the CP to optimize (or minimize) power consumption (S12); generating a power supply voltage having a magnitude controlled in response to the DVS control signal (S13); and providing the power supply voltage to the AP and the CP via a single power rail (S14).

Therefore, a mobile system consistent with an embodiment of the inventive concept may perform a dynamic power supply voltage adjustment based on actual operating condition(s) (e.g., such as operating mode, temperature, data error rate, etc.) for one or more circuit block(s) of the SOC at relatively high speed without degrading performance Therefore, mobile systems consistent with embodiments of the inventive concept include SOC(s), but may yet provide improved performance with reduced power consumption. Here, embodiments of the inventive concept may be applied to an SOC that receives one or more power supply voltage(s) via a single (or a merged) power rail, as well as mobile systems including such SOC.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A system-on-chip (SOC) comprising:
a first circuit block;
a second circuit block; and
a single power rail connected to the first and second circuit blocks, wherein:
the SOC provides, to an external power management integrated circuit (PMIC), a dynamic voltage scaling (DVS) control signal indicating whether each of the first circuit block and the second circuit block is active or inactive,
each of the first circuit block and the second circuit block receives, from the PMIC and directly through the single power rail, a merged power supply voltage having a magnitude corresponding to the DVS control signal, the PMIC further comprises:
    an interface circuit that receives power data including level information of the merged power supply voltage from the SOC,
    a plurality of registers that stores at least respective portions of the power data,
    a selecting circuit that selects and outputs one of signals stored in the plurality of registers in response to the DVS control signal, and
    a comparator that compares at least two signals of the signals stored in the plurality of registers and outputs a signal corresponding to a highest voltage value among the at least two signals, and
  the selecting circuit selects and outputs one signal of: (1) the signal corresponding to the highest voltage value, among the at least two signals, output from the comparator and (2) the signals stored in the plurality of registers in response to the DVS control signal.

2. The system-on-chip (SOC) according to claim 1, wherein the first circuit block includes an application processor and the second circuit block includes a communication processor.

3. The system-on-chip (SOC) according to claim 1, wherein when the first and second circuit blocks are inactive, the magnitude of the merged power supply voltage is a minimal magnitude sufficient to support basic operations of the SOC.

4. The system-on-chip (SOC) according to claim 3, wherein when the first circuit block is active and the second circuit block is inactive, the magnitude of the merged power supply voltage is a first magnitude greater than the minimal magnitude and sufficient to support an active operating mode of the first circuit block.

5. The system-on-chip (SOC) according to claim 4, wherein when the first and second circuit blocks are active, the magnitude of the merged power supply voltage is a second magnitude greater than the first magnitude and sufficient to support the active operating mode of the first circuit block and an active operating mode of the second circuit block.

6. The system-on-chip (SOC) according to claim 1, wherein the first circuit block:
  receives mode information indicating whether the second circuit block is active or inactive from the second circuit block, and
  generates the DVS control signal based on the mode information.

7. The system-on-chip (SOC) according to claim 1, wherein:
  the first circuit block comprises a central processing unit (CPU) that stores the power data including level information of the merged power supply voltage provided by the PMIC, according to whether the first and the second circuit blocks are active or inactive;
  an interface circuit that receives the power data from the CPU and provides the power data to the PMIC; and
  a power control circuit that generates the DVS control signal.

8. The system-on-chip (SOC) according to claim 1, wherein the SOC further comprises a power control circuit that receives first mode information indicating whether the first circuit block is active or inactive from the first circuit block and second mode information indicating whether the second circuit block is active or inactive from the second circuit block and generates the DVS control signal based on the first mode information and the second mode information.

9. A power management integrated circuit (PMIC) comprising:
  an interface circuit that receives power data including level information of a merged power supply voltage from an external system-on-chip (SOC);
  a plurality of registers that store at least respective portions of the power data;
  a selecting circuit that selects and outputs one of signals stored in the plurality of registers in response to a dynamic voltage scaling (DVS) control signal provided from the SOC; and
  a power converter that generates the merged power supply voltage having a level corresponding to an output signal of the selecting circuit, wherein:
  the power converter provides the merged power supply voltage to each of a plurality of circuit blocks within the SOC directly through a single power rail,
  the DVS control signal indicates whether each of the circuit blocks included in the SOC is active or inactive,
  the PMIC further comprises a comparator that compares at least two signals of the signals stored in the plurality of registers and outputs a signal corresponding to a highest voltage value among the at least two signals, and
  the selecting circuit selects and outputs one signal of: (1) the signal corresponding to the highest voltage value, among the at least two signals, output from the comparator and (2) the signals stored in the plurality of registers in response to the DVS control signal.

10. A mobile system comprising:
  a system-on-chip (SOC) comprising a first circuit block and a second circuit block, wherein the SOC generates a dynamic voltage scaling (DVS) control signal indicating whether each of the first circuit block and the second circuit block is active or inactive; and
  a power management integrated circuit (PMIC) that generates a merged power supply voltage, having a magnitude corresponding to the DVS control signal, and provides the merged power supply voltage to each of the first circuit block and the second circuit block directly through a single power rail, wherein:
  the PMIC further comprises:
    an interface circuit that receives power data including level information of the merged power supply voltage from the SOC,
    a plurality of registers that stores at least respective portions of the power data,
    a selecting circuit that selects and outputs one of signals stored in the plurality of registers in response to the DVS control signal, and
    a comparator that compares at least two signals of the signals stored in the plurality of registers and outputs a signal corresponding to a highest voltage value among the at least two signals, and
  the selecting circuit selects and outputs one signal of: (1) the signal corresponding to the highest voltage value, among the at least two signals, output from the comparator and (2) the signals stored in the plurality of registers in response to the DVS control signal.

11. The mobile system according to claim 10, wherein the first circuit block includes an application processor and the second circuit block includes a communication processor.

12. The mobile system according to claim 10, wherein when the first and second circuit blocks are inactive, the magnitude of the merged power supply voltage is a minimal magnitude sufficient to support basic operations of the SOC.

13. The mobile system according to claim 12, wherein when the first circuit block is active and the second circuit block is inactive, the magnitude of the merged power supply voltage is a first magnitude greater than the minimal magnitude and sufficient to support an active operating mode of the first circuit block.

14. The mobile system according to claim 13, wherein when the first and second circuit blocks are active, the magnitude of the merged power supply voltage is a second magnitude greater than the first magnitude and sufficient to support the active operating mode of the first circuit block and an active operating mode of the second circuit block.

15. The mobile system according to claim 10, wherein the first circuit block:
  receives mode information indicating whether the second circuit block is active or inactive from the second circuit block, and
  generates the DVS control signal based on the mode information.

16. The mobile system according to claim 10, wherein the first circuit block comprises:
  a central processing unit (CPU) that stores the power data including level information of the merged power supply voltage provided by the PMIC, according to whether the first and the second circuit blocks are active or inactive;
  an interface circuit that receives the power data from the CPU and provides the power data to the PMIC; and
  a power control circuit that generates the DVS control signal.

17. The mobile system according to claim 10, wherein the SOC further comprises a power control circuit that receives first mode information, indicating whether the first circuit block is active or inactive, from the first circuit block and second mode information indicating whether the second circuit block is active or inactive from the second circuit block and generates the DVS control signal based on the first mode information and the second mode information.

18. The mobile system according to claim 10, wherein the PMIC comprises
  a power converter that generates the merged power supply voltage having a level corresponding to an output signal of the selecting circuit.

* * * * *